US005352936A

United States Patent [19]

Allen

[11] Patent Number: 5,352,936

[45] Date of Patent: Oct. 4, 1994

[54] HIGH VOLTAGE TOLERANT VOLTAGE PUMP CONSTRUCTED FOR A LOW VOLTAGE CMOS PROCESS

[75] Inventor: Michael J. Allen, Rescue, Calif.

[73] Assignee: Intel Corporation, Santa Clara, Calif.

[21] Appl. No.: 73,160

[22] Filed: Jun. 7, 1993

[51] Int. Cl.[5] .......................... H02J 1/00; H02J 11/00; H02J 15/00

[52] U.S. Cl. ................................. 307/304; 307/296.1; 307/264; 307/607; 307/578

[58] Field of Search ...................... 307/296.1, 264, 607, 307/296.8, 482, 578, 304

*Primary Examiner*—William L. Sikes
*Assistant Examiner*—Fetsum Abraham
*Attorney, Agent, or Firm*—Blakely, Sokoloff, Taylor & Zafman

[57] ABSTRACT

An integrated circuit charge pump which includes a pair of serially arranged P channel transistor devices connected with their source and drain terminals in series. The devices are constructed as N well devices in a P substrate. Using a pair of N well devices allows higher voltages to be divided and applied across the two devices without reaching the breakdown limits of either the oxide or the junctions between different portions of the devices used in the process. One of the devices has its body well connected to its drain terminal to provide a diode between the source and body well which allows the device to turn on and off when subject to a series of input pulses at its drain terminal. A third similarly biased N well P channel device is connected in series with the pair of P channel devices to provide the voltage pumping effect at an output terminal. These devices have been found capable of generating voltages levels of ten or more volts to circuitry for programming or erasing flash EEPROM cells even the they are a part of integrated circuitry designed for only 3.3 volt usage.

18 Claims, 3 Drawing Sheets

HIGH VOLTAGE TOLERANT VOLTAGE PUMP CONSTRUCTED FOR A LOW VOLTAGE CMOS PROCESS

BACKGROUND OF THE INVENTION

1. Field Of The Invention

This invention relates to computer systems and, more particularly, to methods and apparatus for providing high voltages in circuitry manufactured by processes typically used to provide low voltage tolerant: integrated circuitry.

2. History Of The Prior Art

A major trend in the manufacture of personal computers is toward portable computers which are able to provide most of the abilities of desktop computers but are packaged in very small and light packages. In order to accomplish this, such portable computers must provide the large storage capacity and the processor speed necessary to run large programs. A typical prior art portable computer uses a great deal of power in order to meet these requirement.

At the same time, computer designers are modifying the components used in such portable computers so that the computers are able to run for long periods while consuming very small amounts of power. In order to reduce power consumption and extend battery life, much of the integrated circuitry used in portable computers is being redesigned to run at low voltage levels. This reduces the power usage and allows more components to be placed closer to one another in the circuitry. The modern circuitry and components used in portable computers are being designed to operate at 3.3 volt levels. This helps a great deal to reduce the power needs of portable computers. Part of this redesign reduces the thickness and size of the various layers, regions, and conductors utilized in order to reduce the size and power consumption of the various components used in the integrated circuits.

However, at the same time, the desire to make portable computers offer all of the advantages of desktop computers opposes this salutary result. Many of the advantages offered by desktop computers require higher voltages to function. For example, one real convenience is the ability to change the BIOS processes as improvements in the computer or its peripherals occur. Historically, this has been accomplished by removing the EPROM or similar circuitry providing the read only memory for storing the BIOS processes and replacing it with new circuitry at additional cost. This is a complicated operation beyond the abilities of many computer users. Recently, flash electrically-erasable programmable read only memory (EEPROM memory) has been used to store BIOS processes. This memory may be reprogrammed without removing the BIOS circuitry from the computer by running a small update program to reprogram the BIOS circuitry when the BIOS processes change. However, reprogramming flash EEPROM memory requires from seven to twelve volts to accomplish. The integrated circuits designed for low voltage use are typically not able to tolerate such high voltages without physical damage.

Another form of flash EEPROM memory array provides another example of high voltage requirements in portable computers. Recently, a new form of long term random access storage has been devised using flash EEPROM memory arrays. An example of a flash EEPROM memory array which may be used in place of a hard disk drive is given in U.S. patent application Ser. No. 07/969,131, entitled *A Method and Circuitry For A Solid State Memory Disk*, S. Wells, filed Oct. 31, 1992, and assigned to the assignee of the present invention. These arrays provide a smaller lighter functional equivalent of a hard disk drive which operates more rapidly and is not as sensitive to physical damage. Such memory arrays are especially useful in portable computers where space is at a premium and weight is extremely important. However, these flash EEPROM memory arrays also require much higher voltages for writing and erasing data than can be tolerated by prior art integrated circuitry adapted to operate at low voltages. Consequently, portable computers using low voltage circuitry have not been able to utilize these modern advantages.

SUMMARY OF THE INVENTION

It is, therefore, an object of the present invention to provide integrated circuitry by which various circuit operations requiring high voltage may be carried out using integrated circuitry which is designed for low voltage operations.

It is another, more specific, object of the present invention to provide a voltage pump circuit for generating high voltages to program and erase a memory array in integrated circuitry designed for low voltage usage.

These and other objects of the present invention are realized in an integrated circuit which includes an integrated circuit charge pump circuit manufactured in a P− substrate material comprising a first P channel N well field effect transistor device having source, gate, and drain terminals, the gate terminal being connected to a voltage source of a first level, the source terminal being connected to receive a voltage of a second level higher than the first level; a second P channel N well field effect transistor device having source, gate, and drain terminals, the gate terminal being connected to its N well and its drain terminal, the source terminal being connected to the drain terminal of the first P channel N well field effect transistor device; a third P channel N well field effect transistor device having source, gate, and drain terminals, the gate terminal being connected to its N well and its drain terminal, the source terminal connected to the drain terminal of the second P channel N well field effect transistor device, and the drain terminal being connected to an output circuit having an input capacitance; and a source of input voltages pulses of a predetermined level at the drain terminal of the second P channel N well field effect transistor device whereby a voltage at the source terminal of the first P channel N well field effect transistor device greater than the voltage at the gate terminal of the first P channel N well field effect transistor device is increased by a voltage essentially equal to the voltage level of the input pulses and furnished to the output circuit by the third P channel N well field effect transistor.

These and other objects and features of the invention will be better understood by reference to the detailed description which follows taken together with the drawings in which like elements are referred to by like designations throughout the several views.

NOTATION AND NOMENCLATURE

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to apparatus for operating a computer in processing electrical or other (e.g. mechanical, chemical) physical signals to generate other desired physical signals.

DETAILED DESCRIPTION OF THE INVENTION

Figure 1:
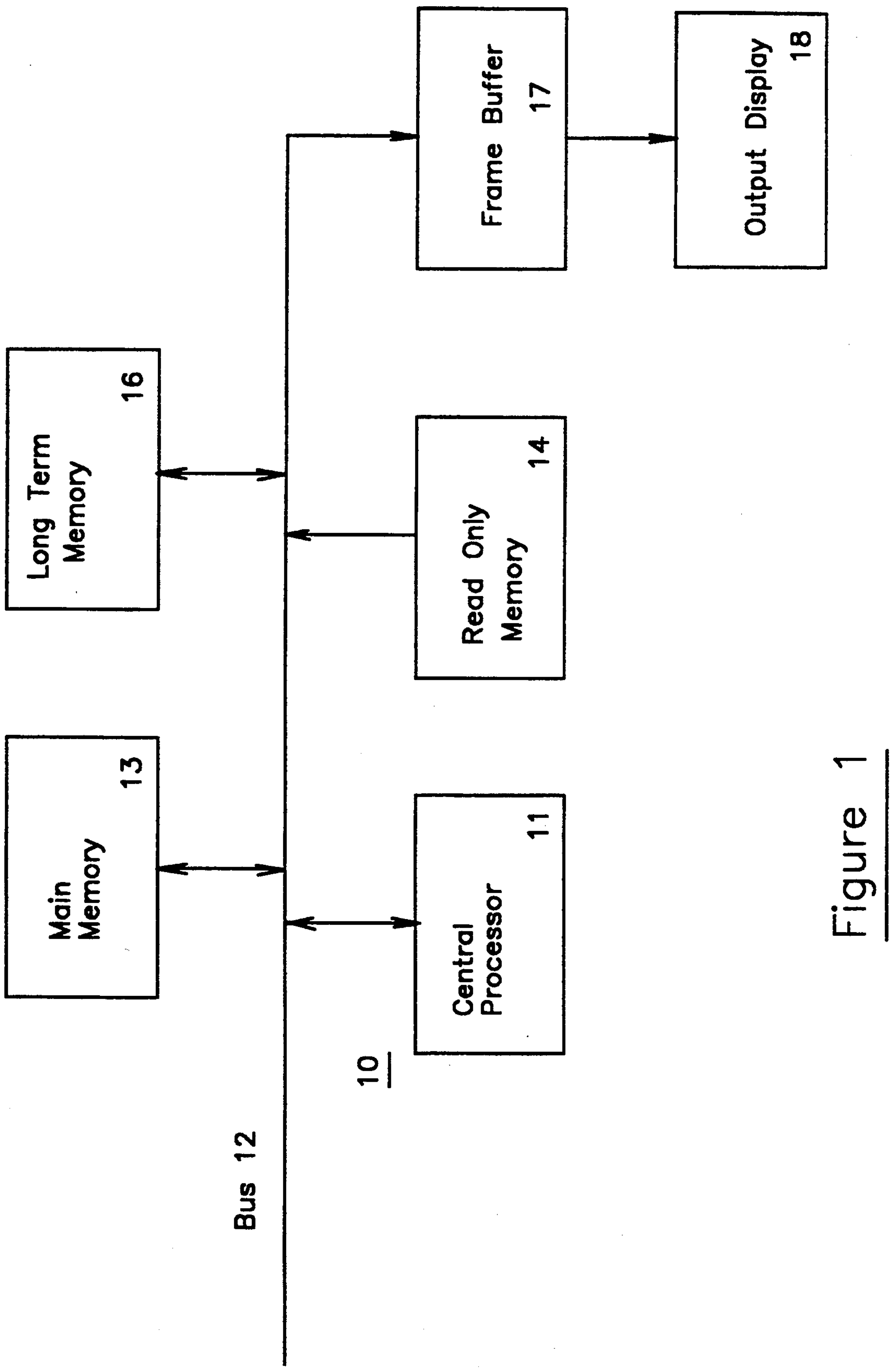
FIG. 1 is a block diagram illustrating a computer system including the present invention.

Referring now to FIG. 1, there is illustrated a computer system 10. The system 10 includes a central processor 11 which carries out the various instructions provided to the computer 10 for its operations. The central processor 11 is joined to a bus 12 adapted to carry information to various components of the system 10. Joined to the bus 12 is main memory 13 which is typically constructed of dynamic random access memory arranged in a manner well known to those skilled in the prior art to store information during a period in which power is provided to the system 10. Also joined to the bus 12 is read only memory 14 which may include various memory devices well known to those skilled in the art each of which is adapted to retain a particular memory condition in the absence of power to the system 10. The read only memory 14 typically stores various basic functions used by the processor 11 such as basic input/output processes and startup processes typically referred to as BIOS processes. Such memory 14 may be constructed of flash EEPROM memory cells adapted to be modified as various ones of the BIOS processes used by a particular computer are changed. If the memory 14 is constructed of flash EEPROM memory cells, it may be modified by running an update process on the computer itself to reprogram the values stored in the memory 14.

Also connected to the bus 12 are various peripheral components such as long term memory 16. The construction and operation of long term memory 16 (typically electro-mechanical hard disk drives) is well known to those skilled in the art. However, rather than the typical electro-mechanical hard disk drive, a flash EEPROM memory array may be used as the long term memory 16. Such flash EEPROM memory arrays are programmed and erased through techniques which utilize voltages greater than the 3.3 volts available to the integrated circuits of more advanced portable computers. Also joined to the bus 12 is circuitry such as a frame buffer 17 to which data may be written which is to be transferred to an output device such as a monitor 18 for display.

Figure 2:
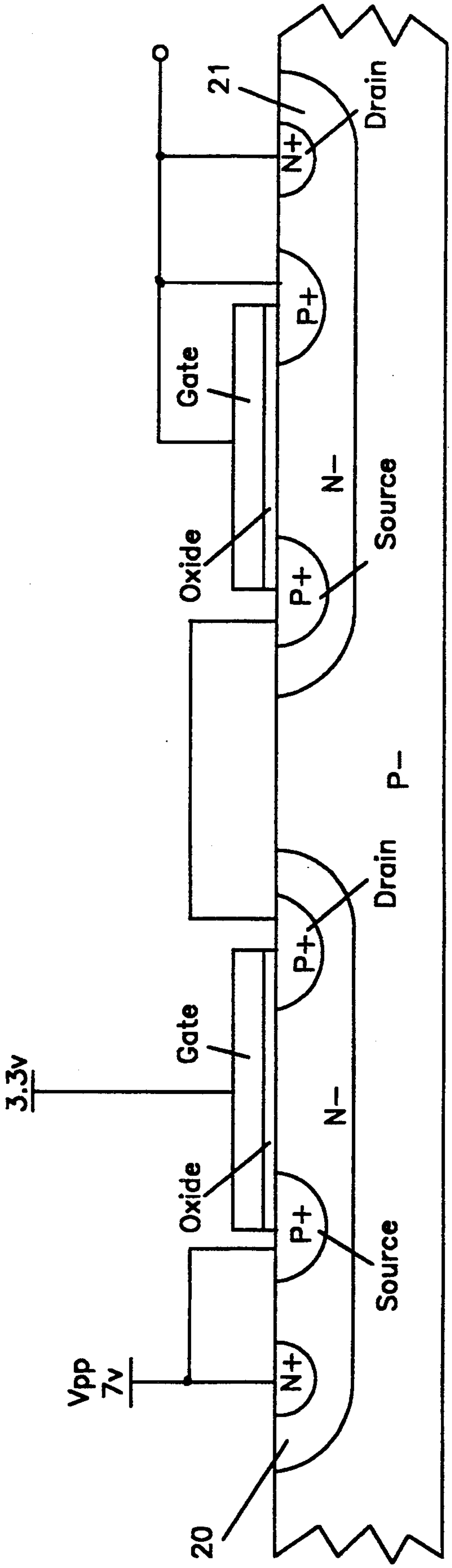
FIG. 2 is a cross-sectional drawing illustrating a side view of the construction of a pair of transistor devices which may be used in accordance with the present invention.

FIG. 2 is a cross-sectional view of two transistor devices 20 and 21 designed in accordance with the present invention. These devices 20 and 21 may be constructed in a manufacturing process which utilizes conventional CMOS techniques. The present invention is adapted to be used with such a process which is designed to provide circuitry constructed to function at low power levels. Such circuitry typically includes integrated circuits basically comprised of N channel field effect transistor devices capable of running at source voltages of 3.3 volts. A manufacturing process of this sort typically provides oxide insulating coatings which are approximately 70 angstroms in thickness. Such coatings are able to withstand voltages of approximately five volts without being subject to electron tunneling which tends to break down and destroy the oxide layer and the effectiveness of the devices. This level of voltage is relatively low compared to the voltages of from seven to twelve volts used to program and erase flash EEPROM memory arrays.

Not only is the voltage tolerance of the oxide layers of such circuitry much lower than the voltages required to program and erase flash EEPROM memory arrays, a manufacturing process of this sort produces semiconductor junctions which are able to withstand various levels of breakdown voltages which are less than the voltages required to program and erase flash EEPROM memory arrays. The various levels of breakdown voltages at semiconductor junctions produced by such a process depend on the particular doping of the layers and the abruptness of the junction profile. For example, a junction in which both the N and P regions are highly doped produces a sharp N+ to P+ junction between regions may be able to withstand voltages of only from a few volts without breakdown. A junction between N+ and P− regions, on the other hand, may be able to withstand voltages of from seven to nine volts without breakdown, while a junction between N− and P− regions may be able to withstand voltages of approximately 20 volts. Various junction may exist over large areas and be able to withstand relatively large voltage differences, while other junctions may be concentrated in small areas and be able to withstand lesser voltage differences. The typical N channel field effect transistor devices produced by the process described above utilize N+ source and drain connection in a P− substrate; and such devices have an upper limit of seven to nine volts before breakdown. Thus, various circuitry which uses flash EEPROM memory devices and is especially useful in portable computers requires from seven to twelve volts for portions of its operation. However, the flash EEPROM memory devices must be a part of integrated circuits which are designed to operate at 3.3 volts and suffer both oxide breakdown and junction breakdown at voltages which are lower than the erase and program voltages of the flash EEPROM arrays.

However, many circuits requiring high voltages have very desirable characteristics which are especially useful in portable computers. For example, flash EEPROM memory arrays are very light in weight, store a great deal of data in a very small space, are not subject to many of the mechanical hazards of hard disk drives, and are much more error free than are hard drives. Consequently, it is very desirable that novel adaptations be found which allow their use in arrangements with low voltage integrated circuitry.

As may be seen in FIG. 2, each of the devices is placed in a separate N− well in the basic P− type silicon material. Each of the devices includes a P+ type volume in the N− well defining a source, a P+ type volume in the N− well defining a drain, a layer of silicon-dioxide insulating material, and a gate terminal separated from the surface of the well (including the surfaces of the well which include the source and drain) by the silicon-dioxide insulating material. Each of the devices has a body tap of N+ polarity formed in the N− well. A conductor from a source of high voltage which may be used for programing flash EEPROM devices joins to the body tap and to the source terminal. The drain terminal of one device 20 is joined to the source terminal of the other device. The gate terminal of the device 20 receives a 3.3 volt biasing potential.

The foregoing arrangement allows a high voltage such as seven volts to be applied at the source terminal of one P channel device 20 and switched to the drain terminal of the other P channel device 21 without producing a voltage larger than that which the integrated circuit is designed to tolerate across any junction between two differently doped regions or across any silicon dioxide layer of the two devices. For example, in the arrangement shown in FIG. 2, the voltage between the gate and source terminals, and thus across the silicon dioxide layer which separates those regions of the device 20, can never be greater than 3.7 volts in the conducting condition of the device. Similarly, the voltage between the gate and drain terminals and across the silicon dioxide layer which separates those regions can never be greater than approximately 3.7 volts in the conducting condition of the device 20. Similarly, except for the N− well to P− substrate which can withstand well above seven volts, the voltage across none of the semiconductor junctions is greater than from three to four volts, an amount insufficient to cause breakdown of the P+ to N− junctions, during any operating condition of these devices. The total value of Vpp (the voltage of the high voltage source) does not appear across the drain to source terminals of either of the two devices in any condition of the devices 20 or 21 as will be seen. Consequently, the devices are well able to handle the high voltages furnished without any breakdown of the junctions or the silicon dioxide insulating layer.

Figure 3:
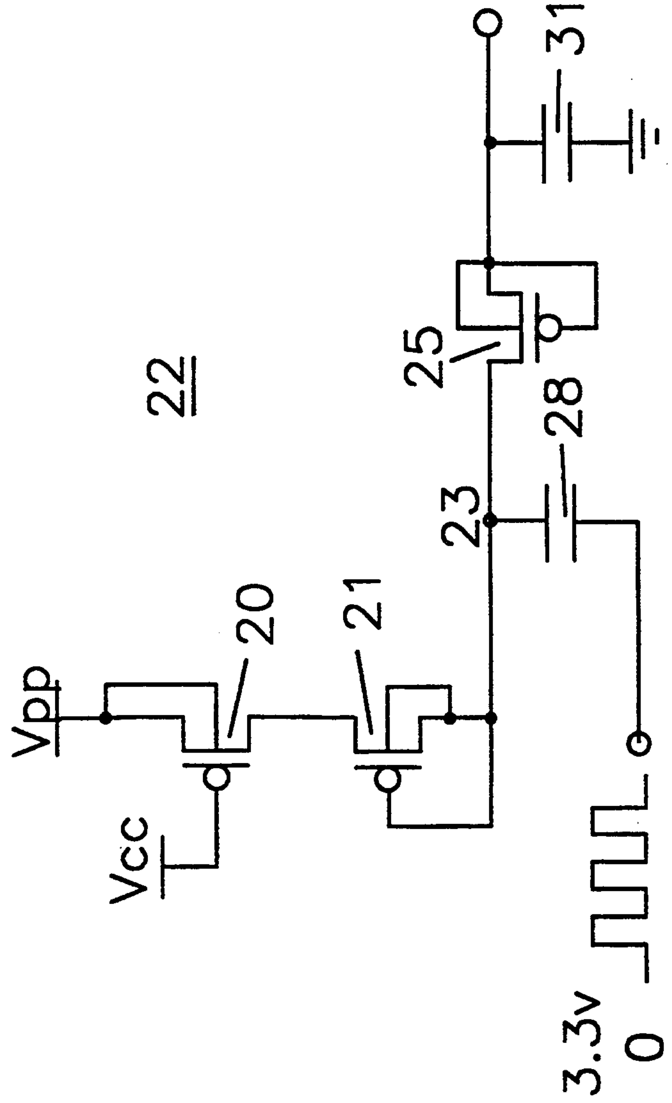
FIG. 3 is a circuit diagram illustrating an arrangement in accordance with the invention for switching high voltages in an integrated circuit designed for low voltages.

Referring now to FIG. 3, there is illustrated a circuit diagram of a voltage pump circuit 22 including the present invention which allows the use of high voltages in circuitry manufactured by a process which usually is used to provide low voltage integrated circuits comprised mainly of N channel devices. The circuit 22 includes a pair of N well P channel devices 20 and 21 which are arranged with their sources and drain terminals in series between a source of high voltage Vpp connected at a first node and a node 9.3. In FIG. 3, the two devices 20 and 21 of FIG. 2 are arranged in series with the drain and source terminals of a P channel device 25. The drain and source terminals of the P channel device 25 are connected to an output terminal at which a capacitance 31 representing a load capacitance is illustrated.

In the arrangement shown, the high voltage (seven volts) available from the source Vpp is furnished at the first node at the source terminal of the device 20. As the voltage Vpp increases to the point at which it is greater than the voltage Vcc by the threshold voltage of the device 20, the device 20 conducts. As the device 20 conducts, this places a value equal to Vpp at a second node at the source terminal of the device 21.

Because the body well of the device 21 and the gate terminal are joined to the drain terminal of the device, a diode junction exists from the source terminal to the body well of the device 21. The high voltage at the source terminal of the device 21 biases the P+ source terminal positive with respect to the body terminal of the device 21 in a forward biased direction. This diode conducts and charges the third node 23 to a voltage equal to the voltage at the source of the device 21 less the diode drop, approximately 6.3 volts in one embodiment. The forward biasing of the diode junction of the device 21 eliminates any large voltage drop across the source-to-drain terminals of the device 21 and precharges the node 23.

It should be noted that the P channel device 25 is biased similarly to the device 21 so that when the node 23 precharges, the diode formed by the source to body well connection conducts. This conduction by the diode of the device 25 precharges the capacitance 31 at the fourth output node to approximately 5.6 volts.

It will be noted that in this condition (as was demonstrated with regard to FIG. 2), no appreciable voltage is dropped between the source and drain terminals of either of the two P channel N well devices 20 and 21. Moreover, the voltage across the oxide layers separating the gate terminal from the P channel in these two N well devices 20 and 21 is at most 3.7 volts (device 20).

The third node 23 receives a series of positive input pulses of approximately 3.3 volts each through a capacitor 28. The first input pulse forces the node 23 to approximately nine volts, back biases the source-to-well diode junction of the device 21 forcing it to turn off, and causes the N well P channel device 25 to switch on. The source-to-well diode of the P channel device 25 conducts and charges the output capacitance (illustrated as a capacitor 31) to approximately 8.5 volts. The value of the input pulse furnished through capacitor 28 then drops to zero awaiting the next pulse. This turns off the device 25 and causes the source-to-well diode of the device 21 to again forward bias and charge the node 23 through the diode action of the device 21. With the next positive pulse of 3.3 volts, the device 21 is again shut off; and a high voltage (9.3 volts) again turns on the device 25 so that charge is transferred to gradually charge the output capacitor 31 to approximately nine volts.

Thus, the circuit of FIG. 5 functions as a charge pump for generating a high voltage level in circuitry produced by a low voltage process without stressing the transistor junctions or oxide layers. The circuit 22 accomplishes this result while providing a means by which high voltages may be generated in integrated circuits the transistor devices of which are designed for use with much lower voltage levels.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. An integrated circuit charge pump circuit manufactured in a P− substrate material comprising:

a first P channel N well field effect transistor device having source, gate, and drain terminals, the gate terminal being connected to a first voltage source of a first level, the source terminal being connected to receive a second voltage of a second level higher than the first level;

a second P channel N well field effect transistor device having source, gate, and drain terminals, the gate terminal being connected to the N well and the drain terminal of the second P channel N well field effect transistor device, the source terminal being connected to the drain terminal of the first P channel N well field effect transistor device;

a third P channel N well field effect transistor device having source, gate, and drain terminals, the gate terminal being connected to the N well and the drain terminal of the third P channel N a well field effect transistor device, the source terminal being connected to the drain terminal of the second P channel N well field effect transistor device, the drain terminal being connected to an output circuit having an input capacitance; and a source of voltage pulses input at the drain of the second P channel N well field effect transistor device whereby the second voltage at the source terminal of the first P channel N well field effect transistor device is increased by a voltage essentially equal to the voltage pulses and furnished to the output circuit by the third P channel N well field effect transistor.

2. An integrated circuit charge pump circuit as claimed in claim 1 in which the voltage pulses input at the drain of the second P channel N well field effect transistor device are of the first level.

3. An integrated circuit comprising:

a plurality of circuit devices joined in a circuit and designed to function with source voltages having a first value; and a charge pump circuit designed to function with source voltages of a second higher level, the charge pump circuit being manufactured in a P− substitute material and comprising a first P channel N well field effect transistor device having source, gate, and drain terminals, the gate terminal being connected to a first voltage source of a first level, the source terminal being connected to receive a second voltage of a second level higher than the first level;

a second P channel N well field effect transistor device having source, gate, and drain terminals, the gate terminal being connected to the N well and the drain terminal of the second P channel N well field effect transistor device, the source terminal being connected to the drain terminal of the first P channel N well field effect transistor device;

a third P channel N well field effect transistor device having source, gate, and drain terminals, the gate terminal being connected to the N well and the drain terminal of the third P channel well field effect transistor device, the source terminal being connected to the drain terminal of the second P channel N well field effect transistor device, the drain terminal being connected to an output circuit having an input capacitance; and a source of voltage pulses input at the drain of the second P channel N well field effect transistor device whereby the second voltage at the source terminal of the first P channel N well field effect transistor device is increased by a voltage essentially equal to the voltage pulses and furnished to the output circuit by the third P channel N well field effect transistor.

4. An integrated circuit as claimed in claim 3 in which the voltage pulses input at the drain terminal of the second P channel N well field effect transistor device are of the first level.

5. An integrated circuit charge pump circuit comprising first, second, third, and fourth circuit nodes;

first means for transferring any voltage of a first level from the first node to the second node;

first diode means for providing a voltage at the second node to the third node whenever a voltage level at the second node is greater than a voltage level at the third node;

means for storing a charge at the third node, second diode means for providing a voltage at the third node to the fourth node whenever a voltage level at the third node is greater than a voltage level at the fourth node;

means for storing a charge at the fourth node, and means for alternately raising and lowering a level of voltage at the third node to alternately bias the first diode means to cease transferring current when a voltage level is raised and to transfer current when a voltage level is lowered and simultaneously to alteratively bias the second diode means to transfer current when a voltage level is raised and to cease transferring current when a voltage level is low.

6. An integrated circuit charge pump circuit as claimed in claim 5 in which the first and second diodes are formed in a current comprising a P channel N well field effect transistor having source, gate, and drain terminals, the gate terminal being connected to the N well and the drain terminal of the P channel N well field effect transistor device.

7. An integrated circuit charge pump circuit as claimed in claim 6 in which the first means for transferring any voltage of a first level from the first node to the second node comprises a P channel N well field effect transistor device having source, gate, and drain terminals, the gate terminal being connected to a voltage source less than the first level, the source terminal being connected to the first node, and
the drain terminal being connected to the second node.

8. An integrated circuit charge pump circuit as claimed in claim 7 in which the means for storing a charge at the third node comprises
a capacitor having first and second terminals,
the first terminal being connected to the third node; and
in which the means for alternately raising and lowering a level of voltage at the third node comprises means for furnishing a series of voltage pulses at the second terminal of the capacitor.

9. An integrated circuit charge pump circuit as claimed in claim 5 in which the first means for transferring any voltage of a first level from the first node to the second node comprises
first P channel N well field effect transistor device having source, gate, and drain terminals,
the gate terminal being connected to a voltage source less than the first level,
the source terminal being connected to the first node, and
the drain terminal being connected to the second node.

10. An integrated circuit charge pump circuit as claimed in claim 9 in which the means for storing a charge at the third node comprises
a capacitor having first and second terminals,
the first terminal being connected to the third node; and
in which the means for alternately raising and lowering a level of voltage at the third node comprises means for furnishing a series of voltage pulses at the second terminal of the capacitor.

11. An integrated circuit charge pump circuit as claimed in claim 10 in which the first and second diodes are formed in a circuit comprising:
a P channel N well field effect transistor device having source, gate, and drain terminals,
the gate terminal being connected to the N well and the drain terminal of the P channel N well field effect transistor device.

12. An integrated circuit comprising:
a plurality of circuit joined in a circuit and designed to function with source voltage having a first value; and
a charge pump circuit designed to function with source voltages of a second higher level, the circuit charge pump circuit comprising
first, second, third and fourth circuit nodes;
first means for transferring any voltage of second level from the first node to the second node;
first diode means for providing a voltage at the second node to the third node whenever a voltage level at the second node is greater than the voltage level at the third node;
means for storing a charge at the third node,
second diode means for providing a voltage at the third node to the fourth node whenever a voltage level at the third node is greater than a voltage level at the fourth node;
means for storing a charge at the fourth node; and
means for alternately raising and lowering a level of voltage at the third node to alternately bias the first diode means to cease transferring current when a voltage level is raised and to transfer current when a voltage level is lowered and simultaneously to alternatively bias the second diode means to transfer current when a voltage level is raised and to cease transferring current when a voltage level is low.

13. An integrated circuit as claimed in claim 12 in which the first and second diodes are formed in a current comprising a P channel N well field effect transistor device having source, gate, and drain terminals,
the gate terminal being connected to the N well and the drain terminal of the P channel N well field effect transistor device.

14. An integrated circuit as claimed in claim 13 in which the first means for transferring any voltage of a second level from the first node to the second node comprises
a P channel N well field effect transistor device having source, gate, and drain terminals,
the gate terminal being connected to a voltage source of the first level,
the source terminal being connected to the first node, and the drain terminal being connected to the second node.

15. An integrated circuit as claimed in claim 14 in which the means for storing a charge at the third node comprises
a capacitor having first and second terminals,
the first terminal being connected to the third node; and
in which the means for alternately raising and lowering a level of voltage at the third node comprises means for furnishing a series of voltage pulses of the first level at the second terminal of the capacitor.

16. An integrated circuit as claimed in claim 12 in which the first means for transferring any voltage of a second level from the first node to the second node comprises
first P channel N well field effect transistor device having source, gate, and drain terminals,
the gate terminal being connected to a voltage source of the first level,
the source terminal being connected to the first node, and
the drain terminal being connected to the second node.

17. An integrated circuit as claimed in claim 16 in which the means for storing a charge at the third node comprises
a capacitor having first and second terminals,
the first terminal being connected to the third note; and
in which the means for alternately raising and lowering a level of voltage at the third node comprises means for furnishing a series of voltage pulses of the first level at the second terminal of the capacitor.

18. An integrated circuit as claimed in claim 17 in which the first and second diodes are formed in a circuit comprising
a P channel N well field effect transistor device having source, gate, and drain terminals,
the gate terminal being connected to the N well and the drain terminal of the P channel N well field effect transistor device.

* * * * *